United States Patent
Viscount et al.

(10) Patent No.: US 7,147,399 B2
(45) Date of Patent: Dec. 12, 2006

(54) APPARATUS FOR SECURELY YET REMOVABLY INSTALLING AN ORNAMENT ONTO A SUBSTANTIVELY PLANAR SURFACE

(75) Inventors: Tom Viscount, Santa Monica, CA (US); John Wadsworth, Los Angeles, CA (US); Craig Janik, Loyola Corners, CA (US)

(73) Assignee: Swicherz, LLC, Santa Monica, CA (US)

( * ) Notice: Subject to any disclaimer, the term of this patent is extended or adjusted under 35 U.S.C. 154(b) by 0 days.

(21) Appl. No.: 10/355,093

(22) Filed: Jan. 31, 2003

(65) Prior Publication Data

US 2004/0037635 A1    Feb. 26, 2004

Related U.S. Application Data

(63) Continuation-in-part of application No. 09/713,138, filed on Nov. 14, 2000, now abandoned.

(60) Provisional application No. 60/164,910, filed on Nov. 15, 1999.

(51) Int. Cl.
    *F16B 7/20* (2006.01)
(52) U.S. Cl. ...................................... 403/349; 403/348
(58) Field of Classification Search ........ 403/348–350; 116/173–175; 285/33, 61–62; D11/165–183
    See application file for complete search history.

(56) References Cited

U.S. PATENT DOCUMENTS

| | | | |
|---|---|---|---|
| 3,016,035 A | 1/1962 | Asbury | 116/63 |
| 3,540,406 A | 11/1970 | Dexter | 116/173 |
| 3,785,584 A | 1/1974 | Crellin, Jr. | |
| 3,853,416 A | 12/1974 | Hanan | |
| 3,897,162 A | 7/1975 | Havark | |
| D244,014 S | 4/1977 | Kim | D11/182 |
| 4,103,642 A | 8/1978 | Swenson | 116/174 |
| 4,532,672 A | 8/1985 | Anderson | |
| 4,544,425 A | 10/1985 | Provolo | |
| 4,593,431 A | 6/1986 | Sandberg et al. | |
| 4,633,215 A | 12/1986 | Anders et al. | 116/173 |
| D292,783 S | 11/1987 | Restrepo | D11/182 |
| 4,727,673 A | 3/1988 | Dumar | 43/17 |
| 4,756,638 A | 7/1988 | Neyret | |
| 4,840,291 A | 6/1989 | Merlin | |
| 4,911,005 A * | 3/1990 | Heyn et al. | 73/187 |
| 5,261,758 A | 11/1993 | Vranish | |
| 5,462,004 A | 10/1995 | McGlothin | 116/173 |
| 5,463,974 A * | 11/1995 | Seeder | 116/173 |
| 5,554,165 A | 9/1996 | Raitt et al. | |
| 5,597,260 A | 1/1997 | Peterson | |
| 5,607,251 A | 3/1997 | Rafn | |
| 5,700,966 A | 12/1997 | LaMarra | 84/645 |
| 5,816,733 A | 10/1998 | Ishikawa et al. | |
| 5,871,335 A | 2/1999 | Bartlett | |

(Continued)

FOREIGN PATENT DOCUMENTS

DE    29614444 U1    12/1997

*Primary Examiner*—Daniel P. Stodola
*Assistant Examiner*—Victor MacArthur
(74) *Attorney, Agent, or Firm*—Cislo & Thomas, LLP (57) ABSTRACT

An apparatus for attaching ornaments onto substantially planar surfaces comprising, a mounting base with an aperture, a coupling device with attachment means and an ornament. The mounting based has a curved surface and is securely attachable to a substantially planar surface. The coupling device is securely or detachably attachable to the mounting base and the ornament is securely or detachably attachable to the coupling device.

14 Claims, 10 Drawing Sheets

U.S. PATENT DOCUMENTS

| | | | |
|---|---|---|---|
| 5,899,167 A * | 5/1999 | Furman | 116/173 |
| 5,899,824 A | 5/1999 | Kurtz et al. | |
| 5,921,199 A | 7/1999 | Gross | 116/173 |
| 5,960,819 A | 10/1999 | Weissinger et al. | |
| 6,012,868 A | 1/2000 | Aoki | |
| 6,045,087 A | 4/2000 | Vislocky et al. | |
| D427,108 S | 6/2000 | Fisher et al. | D11/182 |
| D432,945 S | 10/2000 | Icenhour | D11/166 |
| 6,129,035 A | 10/2000 | Schweinberger | 116/173 |
| 6,213,521 B1 | 4/2001 | Land et al. | 285/61 |
| 6,302,617 B1 * | 10/2001 | Rumpp | 403/348 |

* cited by examiner

APPARATUS FOR SECURELY YET REMOVABLY INSTALLING AN ORNAMENT ONTO A SUBSTANTIVELY PLANAR SURFACE

CROSS-REFERENCES TO RELATED APPLICATIONS

This application is a continuation-in-part of U.S. application Ser. No. 09/713,138, filed Nov. 14, 2000 now abandoned, which claims the benefit of U.S. Provisional Application Ser. No. 60/164,910, filed Nov. 15, 1999, now abandoned.

BACKGROUND OF THE INVENTION

1. Field of the Invention

The present invention relates generally to a unique method for installation and placement of an ornament, and more particularly to a unique method of securely yet removable attaching an ornament onto a substantially planar surface. Such surfaces include snowboards, helmets, related sports accessories, computer monitors, as well as other articles that have substantially planar surfaces.

2. Description of the Related Art

Skateboarding, snowboarding and the like have become increasingly popular during the past years. Many people participating in these activities purchase their own equipment and use this equipment for extended periods of time. It is not uncommon that participants become extremely attached to their equipment and at some point decorate their equipment to their liking. At present, decals and drawings placed on equipment, so that people can personalize them, is quite commonplace. Also, because the younger generation is more likely to participate in these activities, it is quite possible that those participants would desire a change of decals and/or drawings from week to week, even sometimes from day to day. Therefore, it would be highly desirable to provide an apparatus which can be attached to substantially planar surfaces which would provide the ability to securely attach, yet removably attach, ornaments and the like so that the user could interchange these at any time.

The present invention provides an improvement for customizing sporting equipment and the like which achieves these goals. In brief summary, the present invention allows for an ornament to be securely yet removably attached to a base and allows for the interchange of this ornament at the users desire.

SUMMARY OF THE INVENTION

A method for customizing sporting goods, such as snowboards, skateboards and the like, comprising a mounting base with attachment means attached to a substantially planar surface, a detachably attachable coupling device and one or more ornaments or the like.

In order to accomplish this goal, what is needed is an apparatus that allows the ability to attach and detach ornaments and the like from a base, which is attached to a substantially planar surface, quickly and easily such that, when attached, the ornament is securely attached to the base.

In particular, one embodiment of the invention is directed to a system where the attachment means is a bayonet fit mount of a rigid material. In another embodiment, the attachment means is a snap fit mount of a rigid material. In yet another embodiment, the attachment means is an interference fit using an elastomeric material.

An object of this invention is to allow the end user the ability to easily and interchangeably customize his or her equipment. Another object of this invention is to allow the end user the ability for these changes to be done rather quickly and easily. These and other objects and advantages of the present invention will be apparent from a review of the following specification and accompanying drawings.

BRIEF DESCRIPTION OF THE DRAWINGS

FIG. 9 is a perspective view of an ornament and mounting base combination according to the present invention mounted to the upper surface of a skateboard or the like.

DESCRIPTION OF THE PREFERRED EMBODIMENT(S)

The detailed description set forth below in connection with the appended drawings is intended as a description of presently preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

Figure 1:
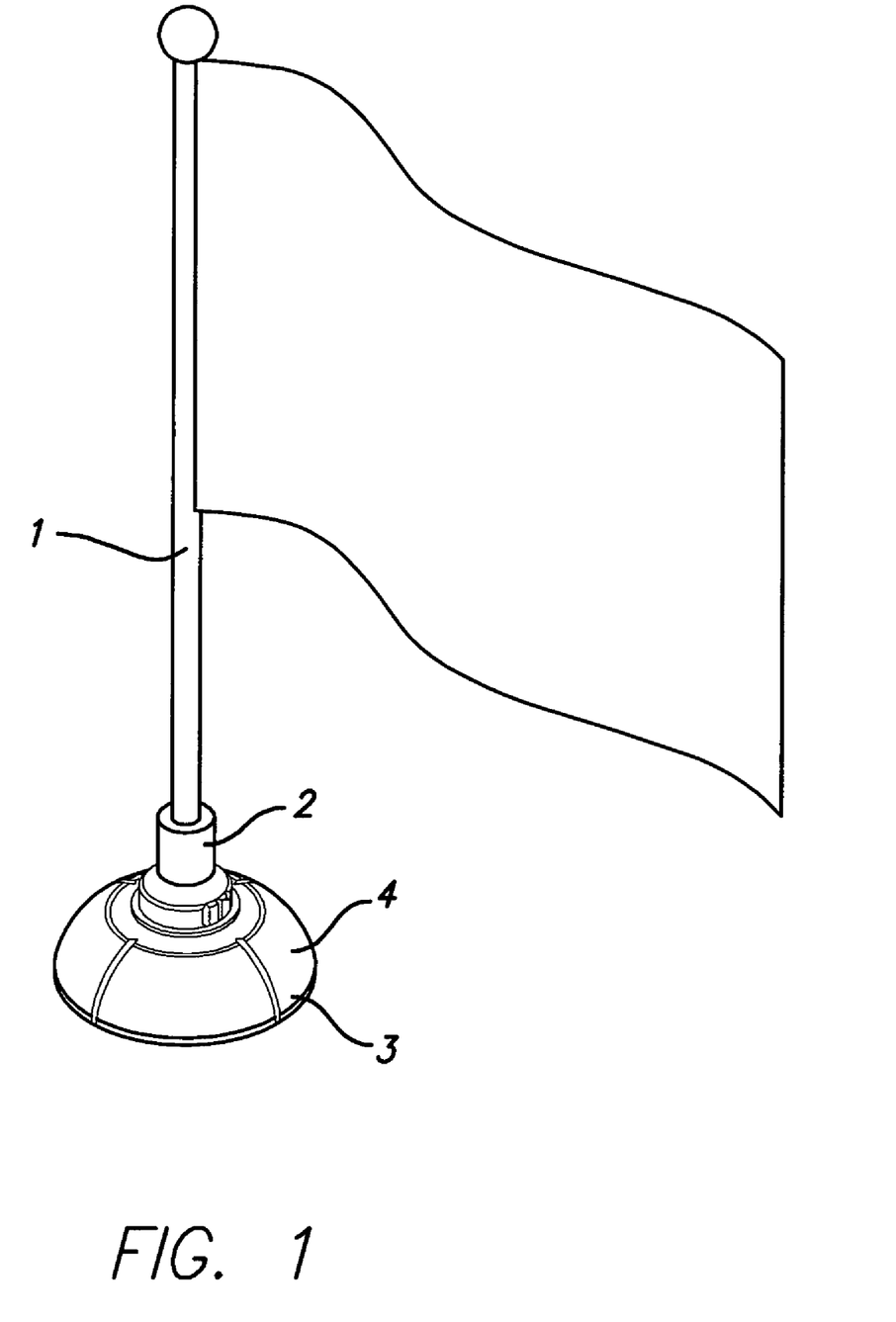
FIG. 1 is a perspective view of one embodiment of the present invention.
Figure 6:
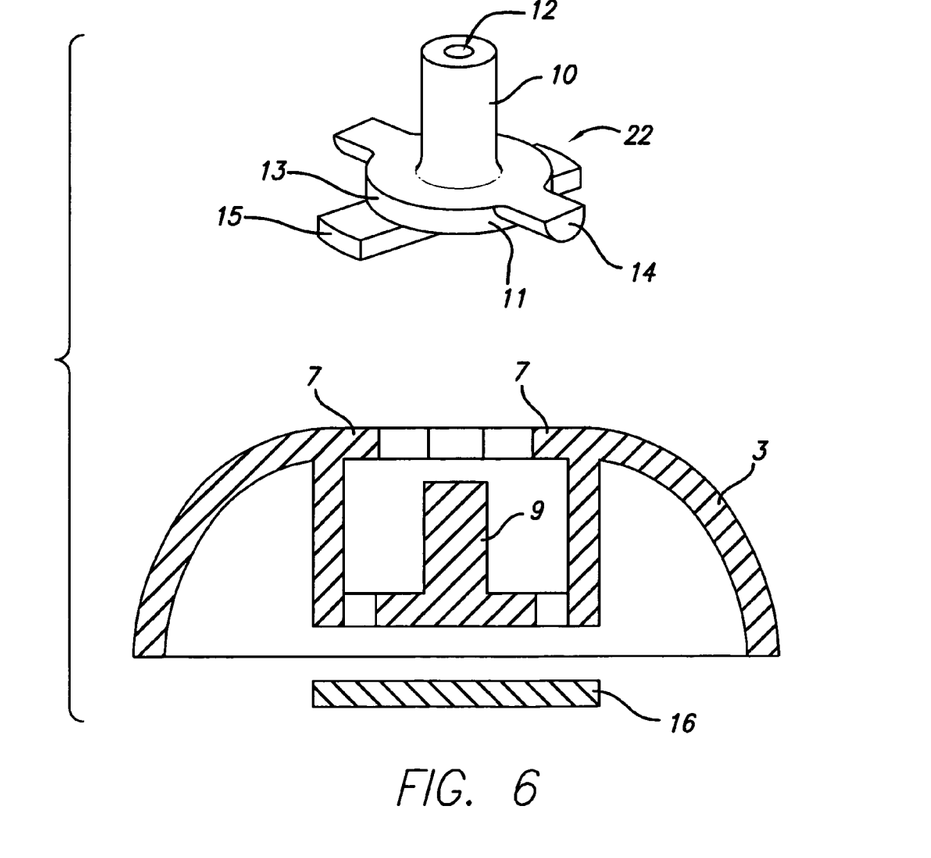
FIG. 6 is a perspective view of a coupling device of one embodiment of the present invention having a bayonet type fitting, along with a cross-sectional view of a mounting base 3 shown for dimension purposes.

In FIG. 1, one embodiment of the present invention is shown. An ornament 1 is securely connected to a coupling device 2, which is securely connected to a mounting base 3. The mounting base 3 has a curved upper surface 4 and a generally planar undersurface (shown in FIG. 6). In this embodiment, the securely connected elements can be either rigid or flexible. The mounting base 3 is securely attached to a substantially planar surface 29 (shown in FIGS. 9 and 10) by way of a pressure sensitive adhesive 16, as shown in FIG. 6. Examples of substantially planar surfaces include, although not limited to, outdoor sports equipment such as snowboards, helmets, related sports accessories, computer monitors, camcorders, and other electronic devices.

Figure 2:
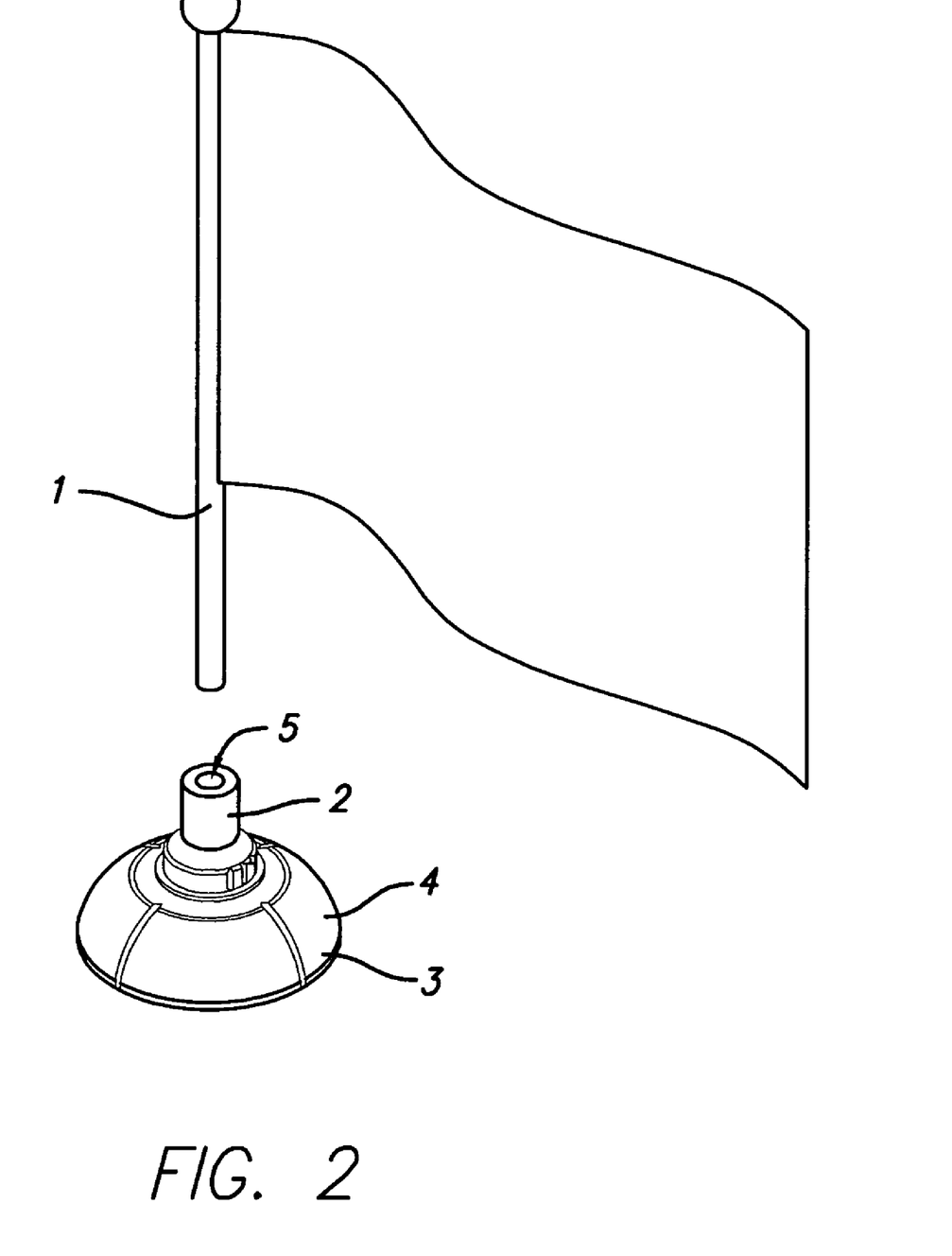
FIG. 2 is a perspective view of another embodiment of the present invention.

In FIG. 2, another embodiment of the present invention is shown. In this embodiment, the coupling device 2 is securely connected to the mounting base 3 and has an opening 5 allowing an ornament 1 to be removably attached. This allows the ornament 1 to be removed and replaced, either for a different function, or if the object is decorative, based on the fashion of the moment. In this embodiment, the ornament 1 can be flexible, while the coupling device 2 and the mounting base 3 are rigid. The ornament 1 need not be flexible, however, but can be a rigid object as well.

Figure 3:
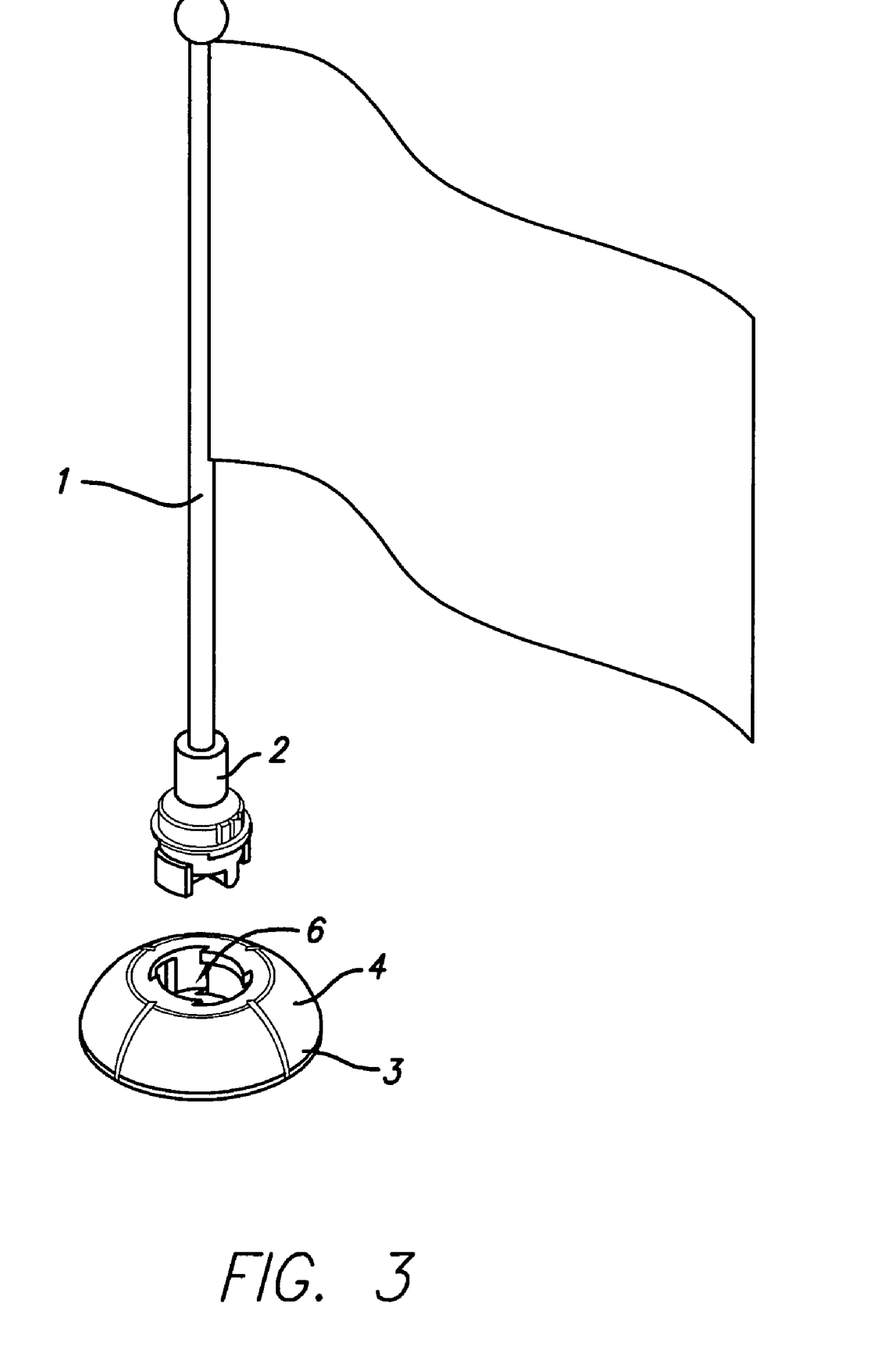
FIG. 3 is a perspective view of another embodiment of the present invention.

FIG. 3 represents yet another embodiment of the present invention. In this embodiment, the ornament 1 is securely connected to the coupling device 2. However, the coupling device 2 is removably attachable to the mounting base 3. The mounting base 3 contains an aperture 6 allowing for the attachment of the coupling device 2. In this embodiment the coupling device 2 and ornament 1 combination is flexible and the mounting base 3 is rigid. However, portions of the coupling device 2 and ornament 1 may each be rigid as well. This embodiment also allows for the user to quickly and efficiently alter the decoration of their product.

Figure 4:
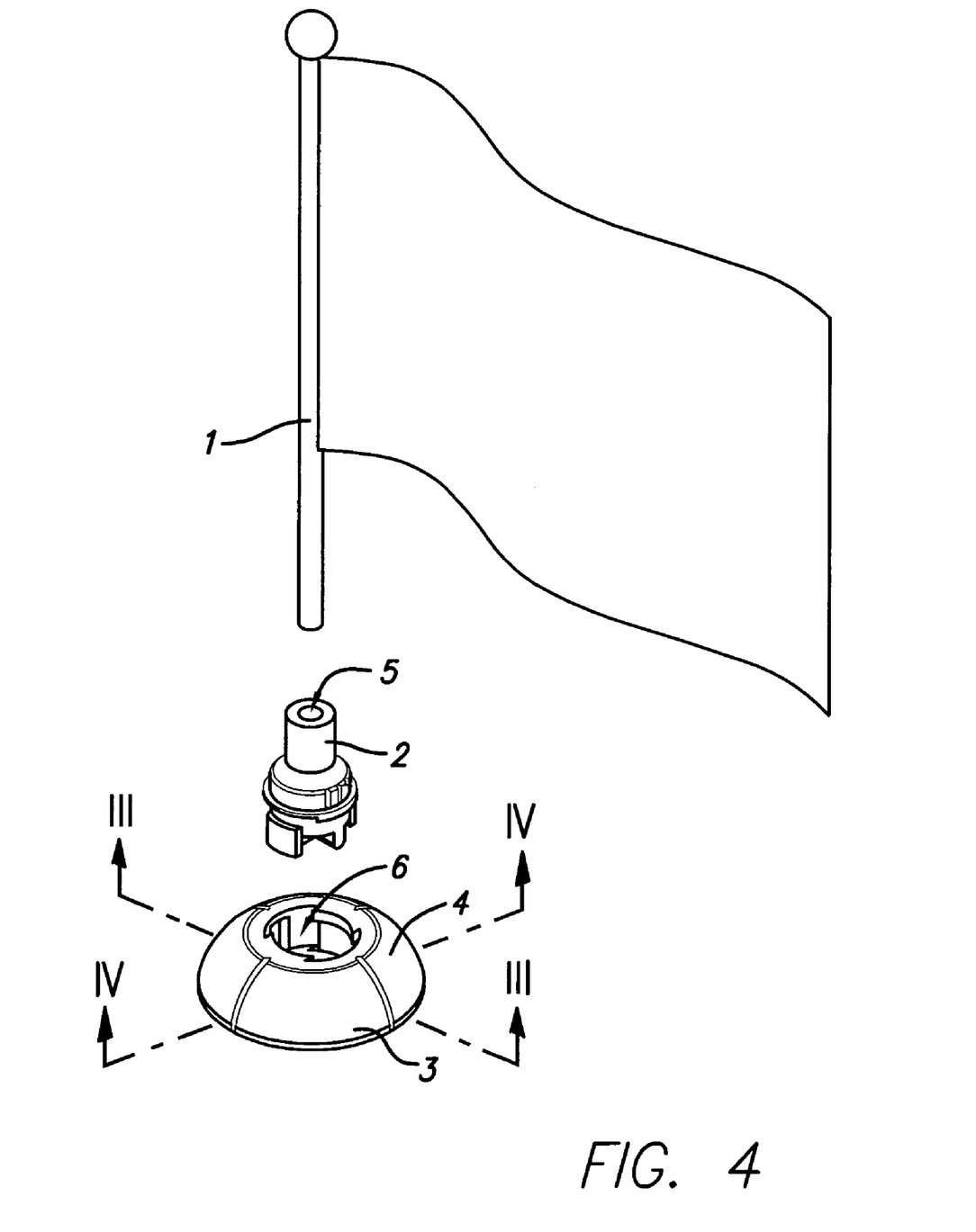
FIG. 4 is an exploded perspective view of a preferred embodiment of the present invention.

FIG. 4 represents the preferred embodiment of the present invention. In this embodiment the mounting base 3 and the coupling device 2 are removably attachable to one another and the coupling device 2 and the ornament 1 are removably attachable to one another. This embodiment is the most accommodating for the user as it allows for the most flexibility of the ability to interchange parts. Not only would it allow users to interchange ornaments 1, but would also allow users the ability to interchange coupling devices 2 that had ornaments 1 already securely attached. In the preferred embodiment, the combination of the ornament 1, the mounting base 3, and the coupling device 2 is flexible. However, the ornament 1, the coupling device 2, or the mounting base 3 may themselves be rigid, and may comprise portions that are flexible as well.

Figure 5:
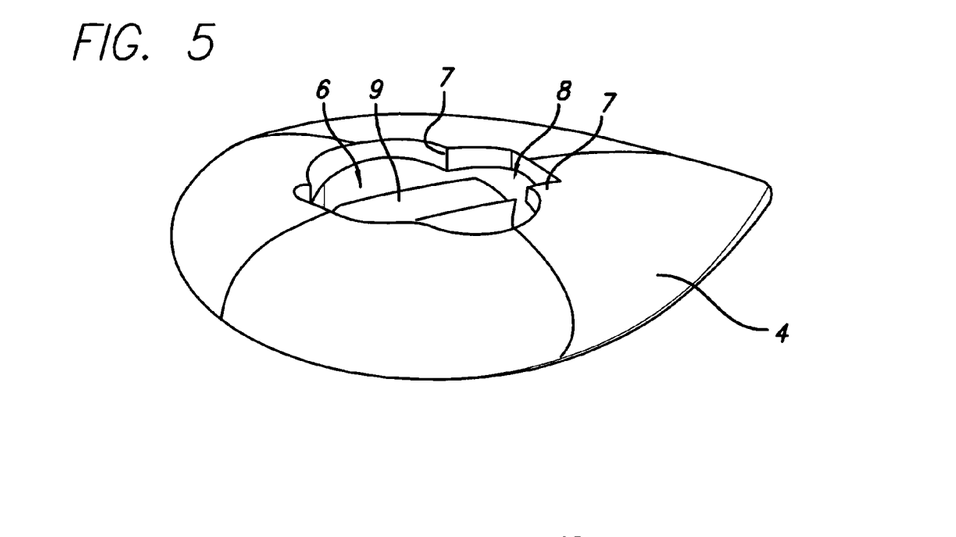
FIG. 5 is a perspective view of a mounting base of another embodiment of the present invention.

In FIG. 5, a mounting base 3 of one embodiment of the present invention is shown. The mounting base 3 has an aperture 6 with lips 7. The lips 7 are formed by an extension of the curved upper surface 4 of the mounting base 3 beyond aperture 6. There are two diametrically opposed gaps 8 adjacent to the lips 7. Also, a rib 9 is located in the center of the aperture 6, which is used to set the orientation of the coupling device (not shown). Although rib 9 is shown as a single rib in line with the diametrically opposed gaps 8, it may alternatively be any pattern of raised structures that are designed to functionally mate with the bottom or side surfaces of the lower portion of coupling device 2. The mounting base 3 could also be modified, by the addition of a hole, for attachment using screws, clips, or other mechanical fasteners.

Figure 7:
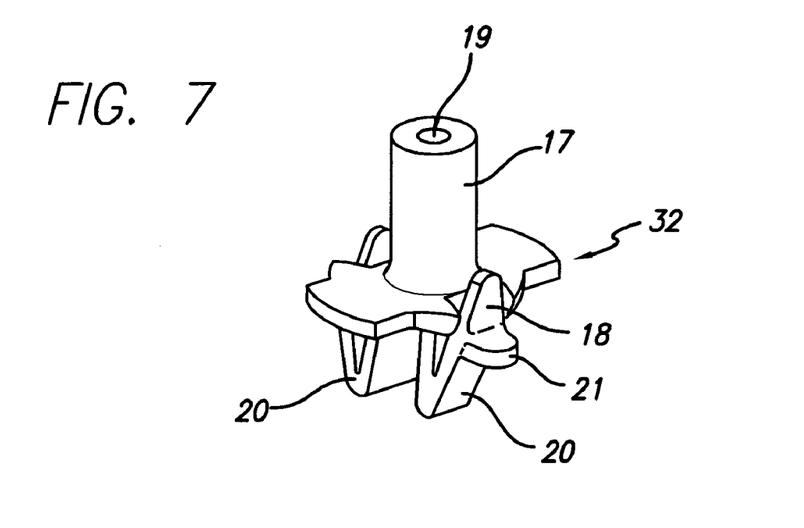
FIG. 7 is a perspective view of a coupling device of one embodiment of the present invention having a snap-fit type fitting.
Figure 8:
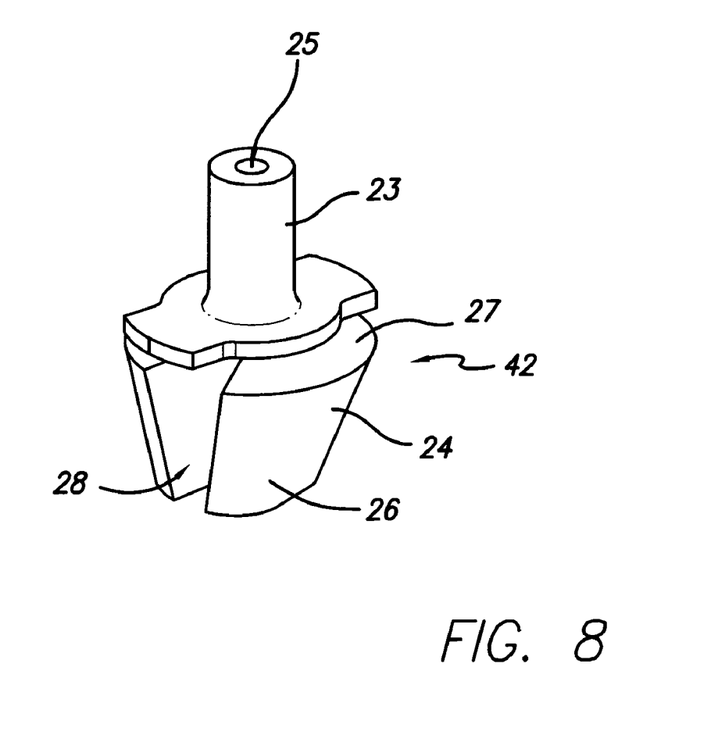
FIG. 8 is a perspective view of a coupling device of one embodiment of the present invention having an interference type fitting.

FIGS. 6, 7, and 8 show the different embodiments of the coupling devices 22, 32, and 42, respectively. The attachment of the coupling devices 22, 32, and 42 and the mounting base 3 can be accomplished several ways. The current invention allows for either bayonet 22 or snap-fit 32 mounts in a rigid material or an interference fit by using an elastomeric material mount 42.

Figure 9:
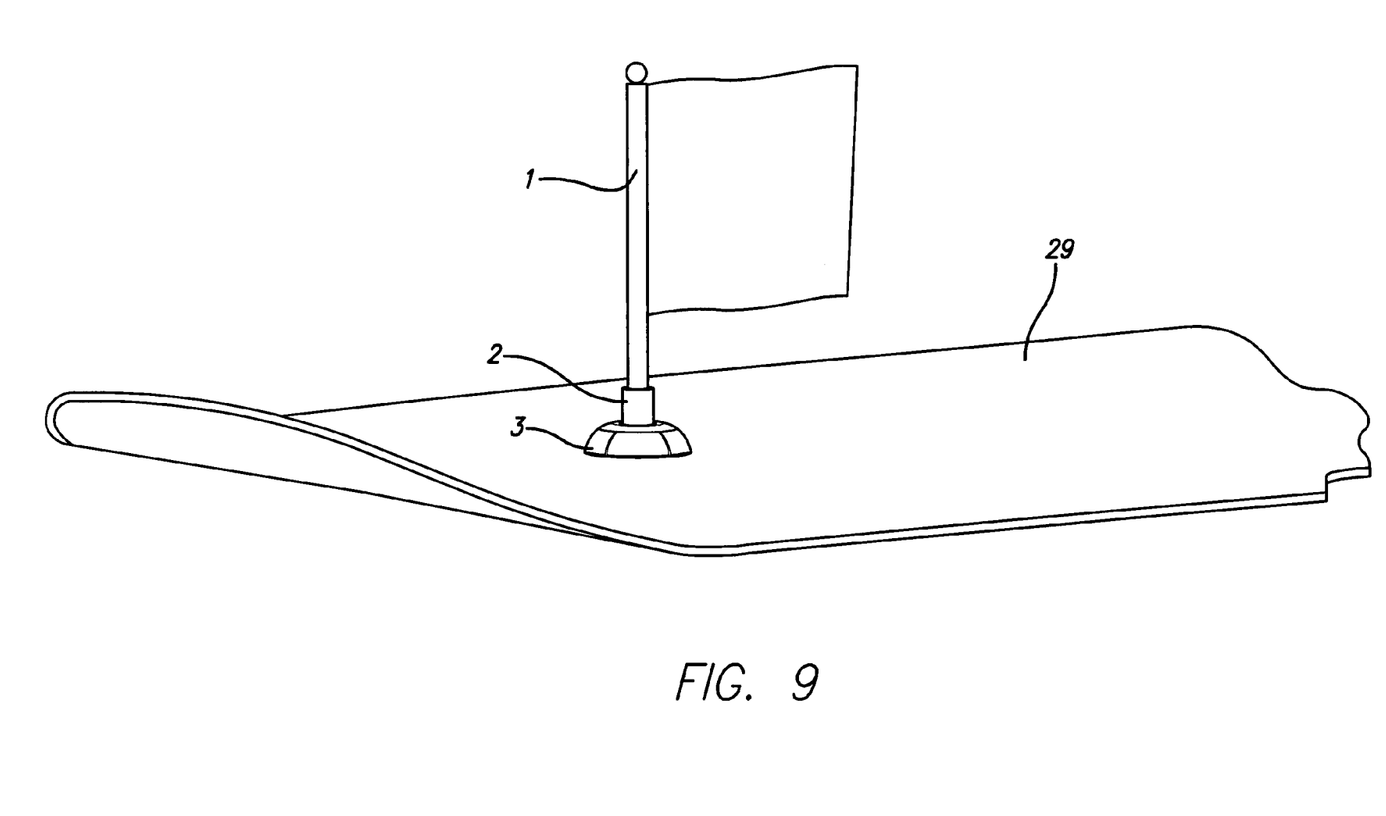

FIG. 6 shows one embodiment of the coupling device 2 and a cross-sectional view of the mounting base 3. The bayonet mount 22 comprises an upper portion 10 and a lower portion 11. The upper portion 10 of the bayonet mount 22 comprises an opening 12 and a circular disc 13 with horizontal extensions 14 rotatably attached to a base 15 on the lower portion 11 of the bayonet mount 22. The base 15 of the bayonet mount 22 is placed into the mounting base 3 by aligning the base 15 with the rib 9 of the mounting base 3. The bayonet mount 23 can be securely attached to the mounting base 3 by rotating the circular disc 13 through a given angle having the horizontal extensions 14 fit under the lips 7 and achieve a tight fit, preferably incorporating some kind of positive locking action. The mounting base 3 securely attaches to a substantially planar surface (as shown in FIG. 9) by an adhesive 16. Such examples of adhesives are common hook-and-loop fasteners (such as Velcro) or double-sided tape, as in the preferred embodiment. In other embodiments the mounting base 3 can be attached to a substantially planar surface by screws, clips, or metal fasteners.

FIG. 7 shows another embodiment of the coupling device 2. The snap fit mount 32 is composed of an upper portion 17 and a lower portion 18. The upper portion 17 has an opening 19 and the lower portion 18 has two arms 20 which extend from the upper portion 17 and bend back on themselves. These arms 20 have projections 21. When the snap fit mount 32 is pressed into the mounting base 3, the projections 21 engage the lips 7 on the mounting base 3. This type of mount is more rigid and can bear a larger load than the elastomeric mount 42. It is also somewhat more secure than the bayonet type mount 22.

FIG. 8 shows yet another embodiment of the coupling device 2. The elastomeric mount 42 is composed of an upper portion 23 and a lower portion 24. The upper portion 23 contains an opening 25. The lower portion 24 comprises a cone shaped projection 26 with a small step 27. There is also a slot 28, bisecting the cone shaped projection 26. This allows the elastomeric mount 42 to be positioned in one of two orientations relative to the rib 9 in the center of the mounting base 3. This approach uses the material properties to allow the elastomeric mount 42 to be pressed into place once it has been aligned to the rib 9. The material will compress pass the lips 7 and will then expand under the lips 7, thereby locking the elastomeric mount 42 in place. Removal is accomplished by "peeling" the elastomeric mount 42 out of the mounting base 3 in the direction of the slots on the lips 7.

Figure 10:
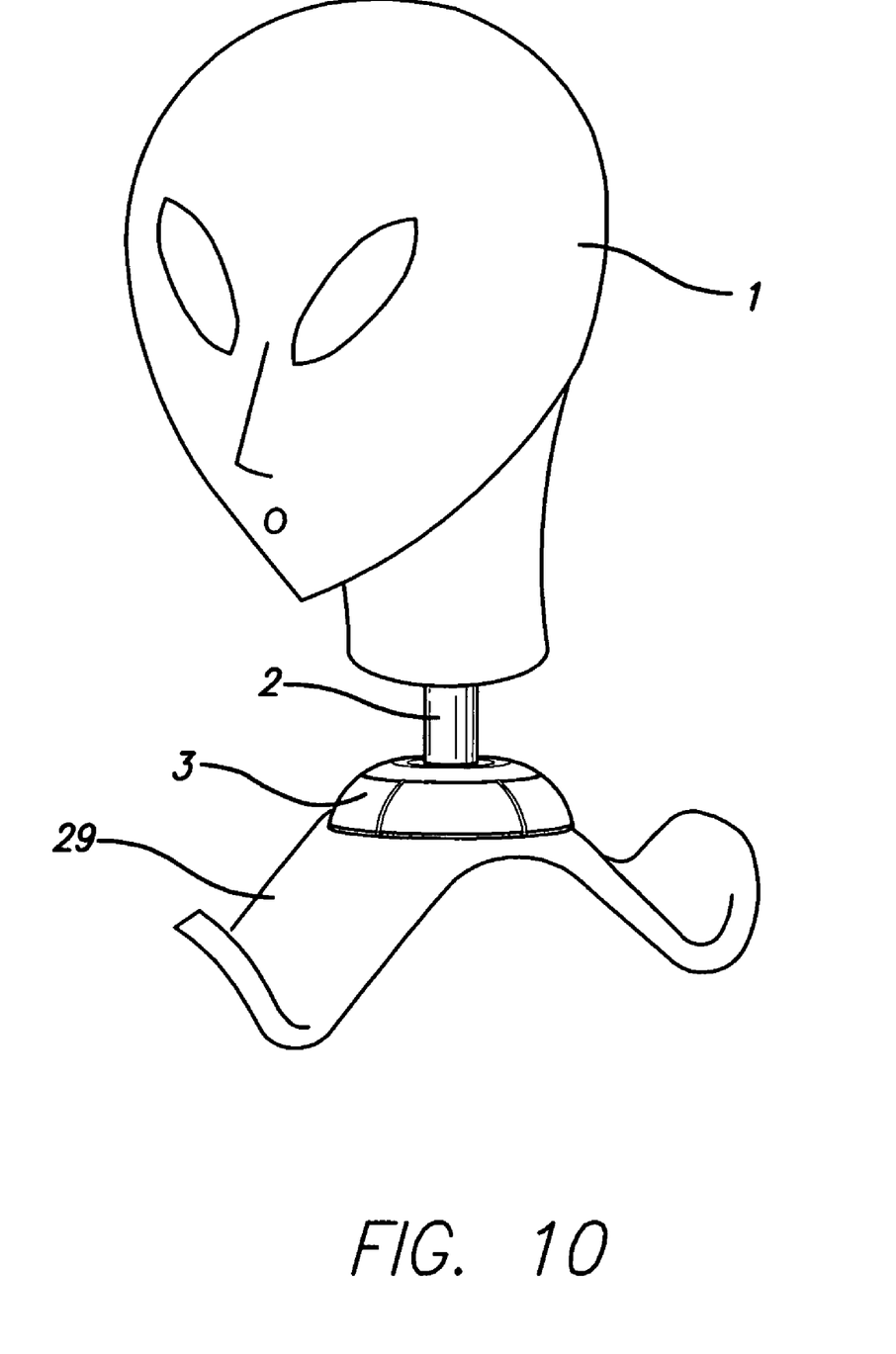
FIG. 10 is a perspective view of an ornament and mounting base combination according to the present invention mounted to a substantially planar surface of a bracket or other mounting structure for attachment to a sporting good.

FIG. 9 represents another embodiment of the present invention. The substantially planar surface 29 resembles a skateboard or a snowboard like object. The decorative ornament 1 is a flag and is attached to a coupling device 2. Other examples of substantially planar surfaces are helmets and computer monitors. Yet another embodiment of the present invention is shown in FIG. 10. In this embodiment, the substantially planar surface 29 would use attachment means such as a rubber band to be attached to another substantially planar surface (not shown), such as a scooter.

Figure 11:
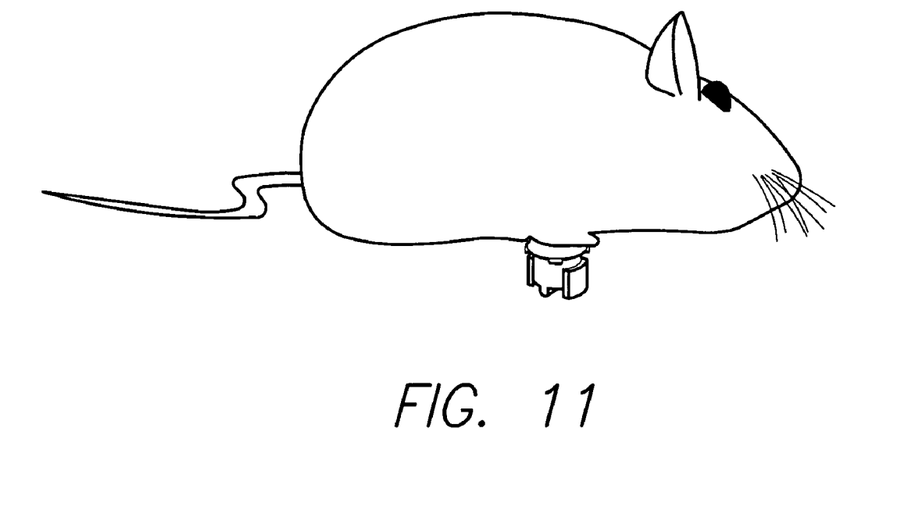
FIG. 11 is a perspective view of an ornament in the general shape of an animal.
Figure 12:
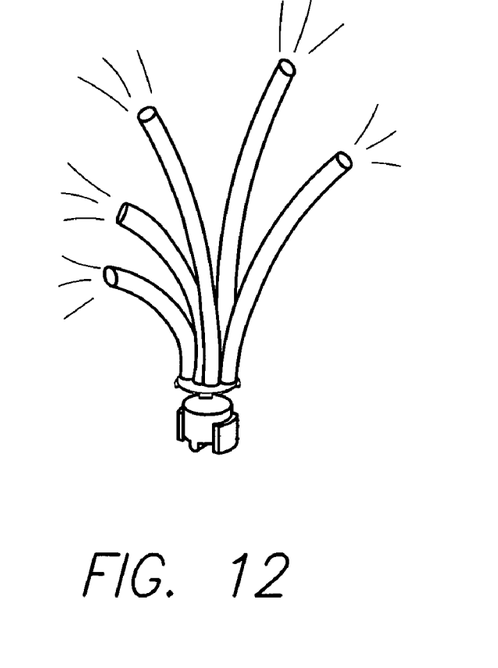
FIG. 12 is a perspective view of an ornament in the general shape of a structure that emits light.

FIGS. 10, 11, and 12 illustrate other ornaments for use in combination with a mounting base 3. FIG. 10 shows a ornament in the form of the head of a fictional alien. FIG. 11 illustrates an ornament in the general shape of an animal, here a mouse. FIG. 12 illustrates a fanciful lighting ornament. A wider variety of ornament shapes and sizes may come in a group or may be separately purchased. The ornaments may be either fanciful or provide some more functional purpose such as identifying or locating the sporting good or user, lighting the way in front of the sporting good, or recording an activity of the user. For example, the eyes and mouth of the alien ornament of FIG. 10 may emit sufficient light to illuminate to immediate environment for the user, or to provide a method for locating the user at dusk or in the dark. Each different ornament of the present invention, however, would be equipped to be coupled to the mounting base 3, either by itself comprising a coupling device 2 or by being easily attached to a separate coupling device 2.

Figure 13:
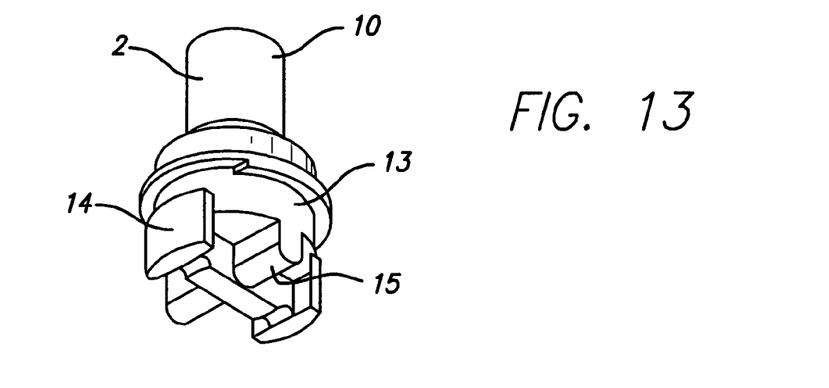
FIG. 13 is a perspective view of the coupling device 2 of one embodiment of the present invention.
Figures 14, 15:
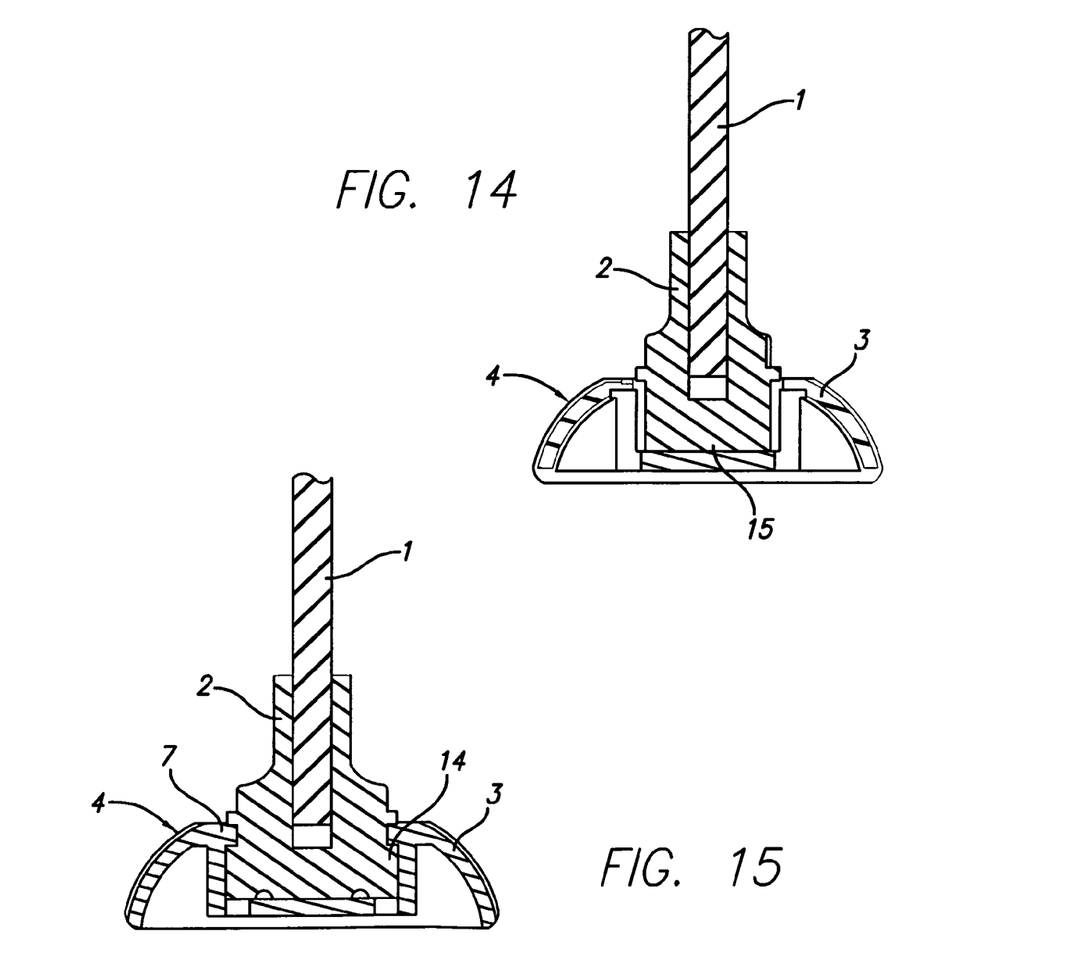
FIG. 14 is a cross-sectional view of the coupling device 2 shown in FIG. 1 when locked in the mounting base 3 along line III—III.
FIG. 15 is a cross-sectional view of the coupling device 2 shown in FIG. 1 when locked in the mounting base 3 along line IV—IV.

FIG. 13 illustrates the lower portion of a preferred coupling device 2. The structures on the lower portion of this coupling device are designed to lockingly engage the structures in the opening 6 of the mounting base 3 so that the coupling device 2 and any ornament 1 attached thereto will be securely fastened to the mounting base 3 and not readily removable erroneously. FIGS. 14 and 15 show the coupling device as it is inserted in opening 6 of mounting base 3 and how the external surfaces lock together and provide resistance to erroneous removal. Yet, intentional removal is easily accomplished by overcoming the mating features 9, discussed further above, and rotating the coupling device so that the extensions 14 (or projections 21) are rotated away from lips 7.

For use on sporting goods, it is desirable to have the decorative ornament 1 be flexible to minimize any injury lest one would fall on the object. There are many ways to accomplish this. One way is to have the decorative ornament 1 made of a flexible elastomeric material such as a flexible vinyl, urethane or other foam material. In addition to the other coupling devices 2, more rigid articles can be mounted using a flexible coupling such as a spring.

The ornament 1, however need not be flexible and may be rigid. Other examples of ornaments that can be used include a flag, a pinwheel, a soft or rigid sculpture, a mounting whistle, a lighted enclosure with a bulb and battery, a miniature camera, and tracking devices, among others. While examples of substantially planar surfaces to which the mounting base 3 may attach is nearly infinite, such surfaces include the outer surfaces of sporting goods, such as skateboards, snowboards, helmets, tents, backpacks, parachutes, computer monitors, camcorders, and other electronic devices and sports equipment.

Although it is inherent in the forgoing description, the ornament 1 within the present invention is typically weather resilient, may vary in size and shape, and is typically less than a foot in height so as to avoid interference with the use of the sporting good. One principal reason for the variety of sizes and shapes of ornament 1 is so that different users may distinguish themselves from one another, or alternatively to identify themselves with a specific group or message. This is essentially a free speech reason.

Another reason for the variety of sizes and shapes of ornament 1, and the easy removal of one ornament and replacement with another ornament, involves the often quickly changing uses of the sporting good. For example, when in a race, the sporting good need to be located or identified, but once the race is completed, there is no further need to track or locate the sporting good. Another example is when the sporting good is used on a weekend, the user may want to display one message, but at other times, the user may want to display a different message. Also, as with any trends, the fashion or preference of the moment may change quickly. Thus, often the desire to display an ornament changes and thus the present invention allows for the ornament 1 to be quickly removed and replaced with another ornament 1 of substantially different size and shape.

Thus, since many applications for the present invention include outdoor activities, the mounting base 3 and coupling device 2 are particularly weather resilient, and portions of the ornaments 1 may also typically be weather resilient.

While the present invention has been described with regards to particular embodiments, it is recognized that additional variations of the present invention may be devised without departing from the inventive concept.

What is claimed is:

1. An apparatus attaching at least one novelty ornaments onto a substantially planar surface of an outdoor sports equipment, comprising:
    (a) an elastomeric mounting base comprising an aperture and a flattened bottom surface mounted on said outdoor sports equipment;
    (b) a coupling device having an upper portion and a lower portion, said lower portion having structures detachably attached to said mounting base;
    (c) at least one novelty ornament attached to said upper portion of said coupling device;
    wherein said mounting base has a convex horizontal upper surface;
    wherein said upper surface of said mounting base forms at least one lip that extends into said aperture, wherein said aperture comprises a rib, and two diametrically opposed gaps at each end of said rib, and wherein said rib is in line with said diametrically opposed gaps; and
    wherein said upper portion of said coupling device comprises an opening wherein said ornament securely detachably attaches, and said coupling device comprises horizontal extensions connected to said lower portion of said coupling device, at least one of said horizontal extensions engaging said at least one lips of said mounting base.

2. An apparatus as set forth in claim 1 wherein said generally planar undersurface of said mounting base securely attaches to said substantially planar surface by a pressure sensitive adhesive.

3. An apparatus as set forth in claim 2, wherein said pressure sensitive adhesive is double sided tape.

4. An apparatus as set forth in claim 2, wherein said pressure sensitive adhesive is a hook and loop fastener.

5. An apparatus as set forth in claim 1 wherein said generally planar undersurface of said mounting base securely attaches to said substantially planar surface by screws or other mechanical fasteners.

6. An apparatus as set forth in claim 1 wherein said substantially planar surface is securely attached to another substantially planar surface by a rubber band.

7. An apparatus as set forth in claim 1, wherein said sports equipment is a vehicle.

8. An apparatus as set forth in claim 7, wherein said vehicle is a snowboard or skateboard.

9. An apparatus as set forth in claim 1, wherein said ornament is made of a rigid material.

10. An apparatus as set forth in claim 1, wherein said coupling device is made of a flexible material.

11. An apparatus attaching at least one novelty ornaments onto a substantially planar surface of an outdoor sports equipment, comprising:
    (a) an elastomeric mounting base comprising an aperture and a flattened bottom surface mounted on said outdoor sports equipment;

(b) a coupling device having an upper portion and a lower portion, said lower portion having structures detachably attached to said mounting base;

(c) at least one novelty ornament attached to said upper portion of said coupling device;

wherein said mounting base has a convex horizontal upper surface; and wherein said structures of the lower portion of the coupling device comprise a quarter-turn bayonet-style fastener.

12. An apparatus attaching at least one novelty ornaments onto a substantially planar surface of an outdoor sports equipment, comprising:

(a) an elastomeric mounting base comprising an aperture and a flattened bottom surface mounted on said outdoor sports equipment;

(b) a coupling device having an upper portion and a lower portion, said lower portion having structures detachably attached to said mounting base;

(c) at least one novelty ornament attached to said upper portion of said coupling device;

wherein said mounting base has a convex horizontal upper surface; and further comprising a plurality of ornaments and necks of different shapes and appearances, each of said necks comprising a quarter-turn bayonet-styled fastener to lockingly but removably attach to the mounting base.

13. A decorative combination adorning an outdoor sporting good, comprising:

an ornament for adornment of the outdoor sporting good, said ornament having a neck portion, said neck portion being of a resilient nature so as to readily bend in the event of a person falling upon the ornament and neck;

a convex-shaped base of a polymeric material having a generally low profile with an aperture generally located on its top surface to receive said neck of an ornament such that said neck is lockingly but removably engaged, said base mountable to a generally flat surface of the outdoor sporting good;

wherein the combination of said ornament in assembly with said base is small enough that it avoids interference with the use of the sporting good while still allowing for adornment; and wherein said neck portion further comprises a quarter-turn bayonet-style fastener for lockingly but removably engaging the convex-shaped base.

14. A decorative combination adorning an outdoor sporting good, comprising:

an ornament having a flexible, non-rigid exterior so as not to represent any risk of injury if fallen upon, said ornament having a neck portion integrally formed to the ornament and descending from a bottom surface of the ornament, said neck portion being of a resilient nature so as to readily bend in the event of a person falling upon the ornament and neck;

a convex-shaped base of a polymeric material having a generally low profile with an aperture generally located on its top surface to receive said neck of an ornament such that said neck is lockingly but removably engaged, said base having an adhesively-mountable undersurface to receive double-faced tape or adhesive to adhere to a generally flat surface of the outdoor sporting good;

wherein the combination of said ornament in assembly with said base is less than one foot in height to avoid interference with the use of the sporting good while still allowing for adornment;

wherein said neck portion further comprises a quarter-turn bayonet-style fastener for lockingly but removably engaging the convex-shaped base.

* * * * *